(12) United States Patent
Tanaka et al.

(10) Patent No.: US 7,489,528 B2
(45) Date of Patent: Feb. 10, 2009

(54) POWER SUPPLY CONTROL METHOD, CURRENT-TO-VOLTAGE CONVERSION CIRCUIT AND ELECTRONIC APPARATUS

(75) Inventors: Shigeo Tanaka, Kawasaki (JP); Hidekiyo Ozawa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/715,390

(22) Filed: Nov. 19, 2003

(65) Prior Publication Data

US 2004/0105285 A1 Jun. 3, 2004

(30) Foreign Application Priority Data

Nov. 29, 2002 (JP) ............................. 2002-348789

(51) Int. Cl.
*H02M 3/335* (2006.01)
(52) U.S. Cl. ..................................... 363/21.01; 363/73
(58) Field of Classification Search ................... 363/15, 363/16, 21.01, 49, 73, 97; 323/274, 284
See application file for complete search history.

(56) References Cited

U.S. PATENT DOCUMENTS

| 4,541,029 | A | * | 9/1985 | Ohyama | ....................... 361/31 |
| 5,933,049 | A | | 8/1999 | Melse | |
| 6,339,314 | B1 | * | 1/2002 | Bruning | ....................... 320/128 |
| 6,414,864 | B1 | | 7/2002 | Hoshi | ............................ 363/69 |
| 6,812,682 | B2 | * | 11/2004 | Hachiya | ....................... 323/284 |
| 6,903,945 | B2 | * | 6/2005 | Kitano | ....................... 363/21.01 |
| 6,986,067 | B2 | * | 1/2006 | Odaohhara et al. | .......... 713/320 |
| 2002/0023235 | A1 | | 2/2002 | Odaohhara | |
| 2004/0125620 | A1 | * | 7/2004 | Yamashita | ............... 363/21.01 |

FOREIGN PATENT DOCUMENTS

| CN | 1168200 A | | 12/1997 |
| CN | 2429977 Y | | 5/2001 |
| JP | 06-292363 | | 10/1994 |
| JP | 7-307166 | | 11/1995 |
| JP | 11-299093 | | 10/1999 |
| JP | 2000-217161 | | 8/2000 |
| JP | 2000308257 A | * | 11/2000 |
| JP | 2001-128389 | | 5/2001 |
| JP | 2001-145355 | | 5/2001 |
| JP | 2002-21773 | | 1/2002 |
| JP | 2002-62952 | | 2/2002 |
| JP | 2002-315319 | | 10/2002 |
| JP | 2002-315329 | | 10/2002 |

OTHER PUBLICATIONS

Japanese Office Action dated Aug. 8, 2006.

* cited by examiner

*Primary Examiner*—Adolf Berhane
(74) *Attorney, Agent, or Firm*—Westerman, Hattori, Daniels & Adrian, LLP.

(57) ABSTRACT

A power supply control method is adapted to a current-to-voltage conversion circuit which has a transformer for converting and outputting an input power. The power supply control method stops a power supply to the transformer when an output side of the current-to-voltage conversion circuit is in a no-load state, and starts a power supply to the transformer when an external voltage is applied to the output side of the current-to-voltage conversion circuit.

7 Claims, 8 Drawing Sheets

POWER SUPPLY CONTROL METHOD, CURRENT-TO-VOLTAGE CONVERSION CIRCUIT AND ELECTRONIC APPARATUS

BACKGROUND OF THE INVENTION

This application claims the benefit of a Japanese Patent Application No. 2002-348789 filed Nov. 29, 2002, in the Japanese Patent Office, the disclosure of which is hereby incorporated by reference.

1. Field of the Invention

The present invention generally relates to power supply control methods, current-to-voltage conversion circuits and electronic apparatuses, and more particularly to a power supply control method for making a standby power zero, a current-to-voltage conversion circuit for use by such a power supply control method, and an electronic apparatus which uses such a current-to-voltage conversion circuit.

A current-to-voltage conversion circuit (hereinafter simply referred to as current-voltage conversion circuit) or, a power supply circuit, which is used in an AC adapter or the like, converts a commercial AC power supply voltage into a DC power supply voltage which is required by an electronic apparatus. The current-voltage conversion circuit consumes power even when the electronic apparatus is in a standby state or a stopped state, and such a consumed power is often referred to as a standby power. The standby power is generated even if the power consumption of the electronic apparatus is zero, because of an excitation power consumed by a magnetic circuit, such as a transformer, which is assembled within the current-voltage conversion circuit.

2. Description of the Related Art

In portable electronic apparatuses such as lap-top personal computers, a battery is provided as a power supply for the electronic apparatus. Generally, for reasons such as the operating cost of the electronic apparatus and an instantaneously dischargeable current capacity, a secondary battery such as a $Li^+$ (lithium ion) battery is provided. In addition, a charging circuit is provided in most electronic apparatuses, so that the secondary battery of the electronic apparatus may be easily charged by connecting an AC adapter or the like to the electronic apparatus.

In the case of the portable electronic apparatus, the secondary battery is normally used as the power supply of the electronic apparatus. But when operating the portable electronic apparatus on a desk, for example, the electronic apparatus may be operated by using an external power supply via the AC adapter. When the electronic apparatus is operated by the external power supply via the AC adapter, the AC adapter operates to output a rated voltage, even when the electronic apparatus is in the standby state or the stopped state.

Figure 1:
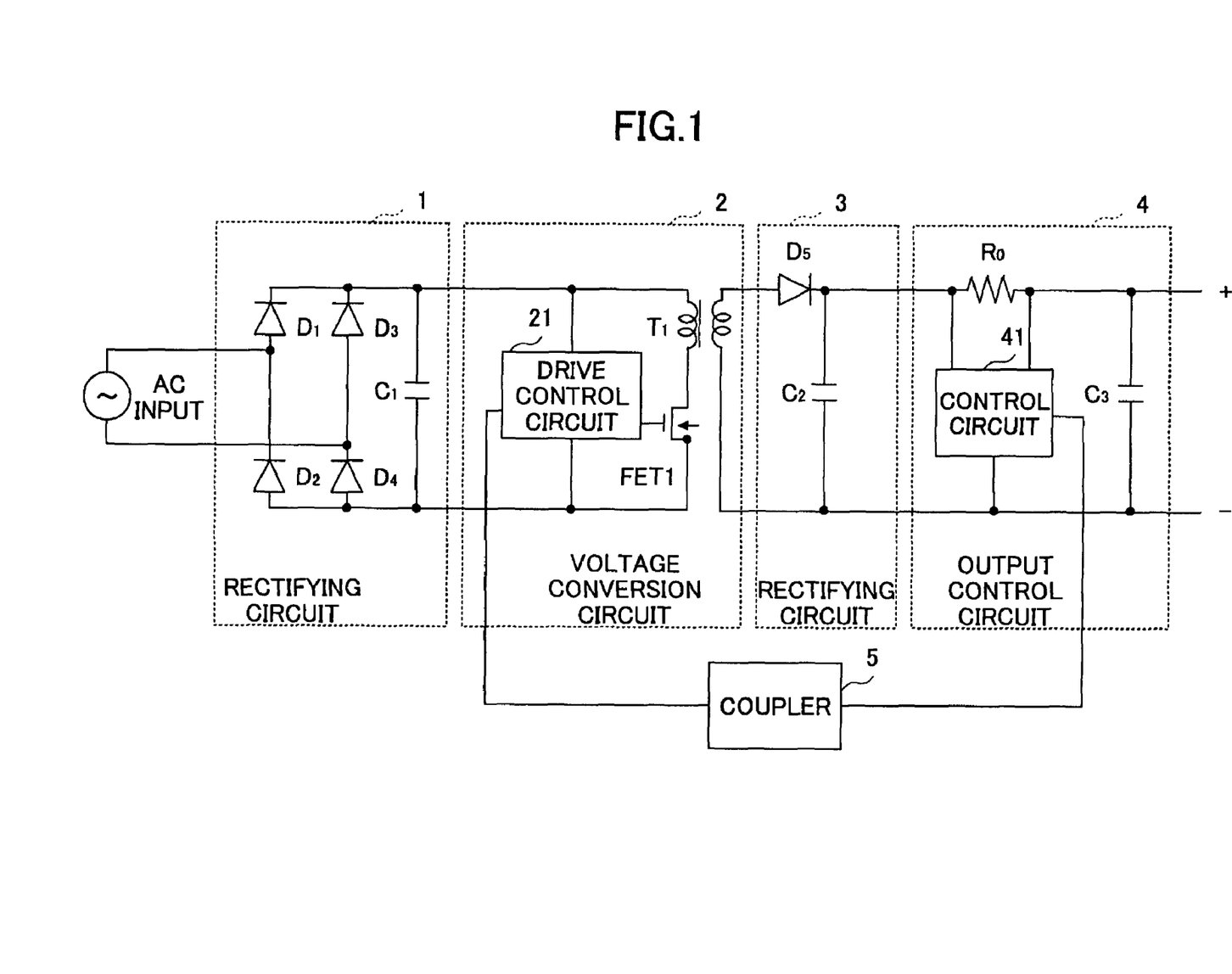
FIG. 1 is a circuit diagram showing an example of a conventional AC adapter which converts a commercial AC power supply voltage into a DC power supply voltage which is required by an electronic apparatus.

FIG. 1 is a circuit diagram showing an example of a conventional AC adapter which converts a commercial AC power supply voltage into a DC power supply voltage which is required by an electronic apparatus. The AC adapter shown in FIG. 1 includes a rectifying circuit 1 for rectifying the commercial AC power supply voltage, a voltage conversion circuit 2 for converting an input voltage into an output voltage, a rectifying circuit 3 for rectifying a secondary side output of a transformer T1 within the voltage conversion circuit 2, an output control circuit 4 for controlling the secondary side output, and a coupler circuit 5 for transferring a control state of the secondary side output to a primary side of the transformer T1 within the voltage conversion circuit 2.

The rectifying circuit 1 includes rectifying diodes D1 through D4 for subjecting an AC input to a full-wave rectification, and a smoothing capacitor C1 for smoothing a rectified input thereto. The voltage conversion circuit 2 includes the transformer T1 for voltage conversion, a switching circuit FET1 for turning ON/FF a current which flows through the transformer T1, and a drive control circuit 21 for controlling an ON/OFF state of the switching circuit FET1. The rectifying circuit 3 includes a rectifying diode D5 for rectifying a voltage which has been converted by the voltage conversion circuit 2, and a smoothing capacitor C2 for smoothing a rectified input thereto.

The output control circuit 4 includes a sense resistor R0 for detecting an output current, and a control circuit 41 for controlling the output current and the output voltage. The coupler circuit 5 transfers the output of the output control circuit 4 to the primary side of the transformer T1. For example, the coupler circuit 5 is formed by a photo-coupler which electrically insulates the primary side and the secondary side of the transformer T1.

Figure 2:
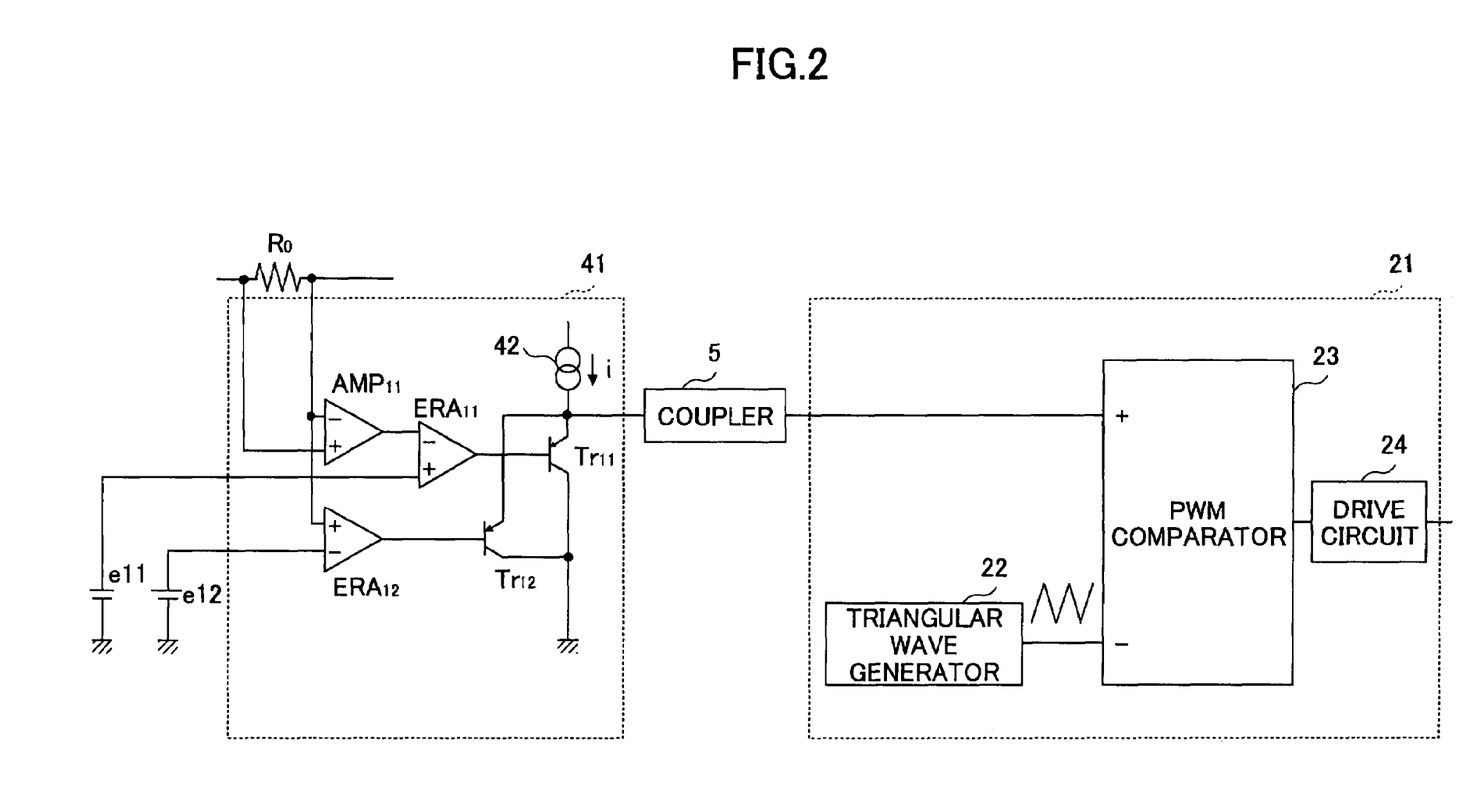
FIG. 2 is a circuit diagram showing a control circuit and a drive control circuit 21 shown in FIG. 1.

FIG. 2 is a circuit diagram showing the control circuit 41 and the drive control circuit 21 shown in FIG. 1. In FIG. 2, the drive control circuit 21 includes a triangular wave oscillator 22, a pulse-width-modulation (PWM) comparator 23, and a drive circuit 24. The control circuit 41 includes a voltage amplifier AMP11, error amplifiers ERA11 and ERA12, transistors Tr11 and Tr12, and a current source 42.

In FIG. 2, a reference voltage e11 determines the output current value, and a reference voltage e12 determines the output voltage value. The voltage amplifier AMP11 of the control circuit 41 measures a voltage drop caused by a current flowing through the sense resistor R0, and outputs a voltage proportional to the current value flowing through the sense resistor R0. The error amplifier ERA11 compares the output voltage of the voltage amplifier AMP11 and the reference voltage e1. If the current flowing through the sense resistor R0 is large, a small voltage is output from the error amplifier ERA11. A large voltage is output from the error amplifier ERA11 if the current flowing through the sense resistor R0 is small. Similarly, the error amplifier ERA12 compares an output voltage of the AC adapter and the reference voltage e2.

The transistors Tr11 and Tr12 form a circuit for outputting a smaller one of output voltages of the error amplifiers ERA11 and ERA12. The smaller one of the output voltages of the error amplifiers ERA11 and ERA12 is supplied to the PWM comparator 23 of the drive control circuit 21, via the coupler circuit 5 which electrically insulates the primary side and the secondary side of the transformer T1.

The PWM comparator 23 within the drive control circuit 21 has a non-inverting input terminal and an inverting input terminal, and is a kind of a voltage pulse width converter which controls an ON-time of an output pulse depending on the input voltage thereto. The PWM comparator 23 outputs a signal which becomes ON during a time in which the triangular wave input to the inverting input terminal from the triangular wave oscillator 22 is smaller than the output voltage of the control circuit 41 which is input to the non-inverting input terminal via the coupler circuit 6. The output signal of the PWM comparator 23 is output to the drive control circuit 21 via the drive circuit 24.

In FIG. 1, when the switching circuit FET1 is ON, the input current from the rectifying circuit 1 flows to the primary side coil of the transformer T1, and the output current flows to the secondary side coil of the transformer T1 when the switching circuit FET1 is turned OFF. An energy stored in the primary side coil of the transformer T1 and an energy discharged from the secondary side coil of the transformer T1 are the same, and thus, an output voltage Vout may be obtained from the following formula (1), where Vin denotes the input voltage, Ton and Toff respectively denote the ON-time and the OFF-time of the switching circuit FET1, and it is assumed for the sake of convenience that a number of turns of the primary side coil of the transformer T1 and a number of turns of the secondary side coil of the transformer T1 are the same.

$$Vin \times Ton = Vout \times Toff \qquad (1)$$

Accordingly, if the formula (1) is rearranged for the output voltage Vout, the following formula (2) is obtained, and a change in the input voltage Vin can be controlled by a ratio of the ON-time Ton and the OFF-time Toff of the switching circuit FET1.

$$Vout = (Ton/Toff) \times Vin \qquad (2)$$

The AC adapter operates to always output the rated voltage when the AC power supply voltage is input thereto. Hence, the AC adapter operates to always output the rated voltage as long as the AC adapter is connected to the commercial AC power supply, regardless of whether or not the AC adapter is connected to the electronic apparatus. For this reason, even if the electronic apparatus which is connected to the AC adapter is in a power supply OFF state and consumes no power, and the AC adapter is in a no-load state, the AC adapter still operates to output the rated voltage.

Therefore, even in the no-load state of the AC adapter, the control circuits 21 and 41 within the AC adapter operate to output the rated voltage, and the AC adapter itself consumes the standby power. In order to prevent the AC adapter from consuming the standby power, it is necessary to completely stop the operation of the AC adapter, but in order to be able to start the operation of the electronic apparatus, which is connected to the AC adapter, at any time, the AC adapter must always be in the standby state.

Various methods have been proposed to reduce the standby power of the AC adapter when the electronic apparatus is in the standby state or the stopped state.

According to a first conventional method, the operating speed or frequency of the AC adapter is decreased or, the operating frequency of the AC adapter is decreased while at the same time intermittently operating the AC adapter, so as to reduce the power consumption of the AC adapter itself while maintaining the desired output voltage. More particularly, the operating frequency of the AC adapter is decreased by decreasing an oscillation frequency of the triangular wave oscillator shown in FIG. 2. This first conventional method is proposed in a Japanese Laid-Open Application No. 2000-217161, for example.

According to a second conventional method, the power consumption of the primary side circuit of the AC adapter is reduced. In other words, since the primary side of the AC adapter operates by the commercial AC power supply voltage, the power consumption is reduce by decreasing the AC voltage. When the AC adapter starts to operate, the operation is started using the primary side input voltage. However, after the operation of the AC adapter starts, the power consumption of the AC adapter is reduced by utilizing a third voltage which is created in the AC adapter and is lower than the primary side input voltage.

Figure 3:
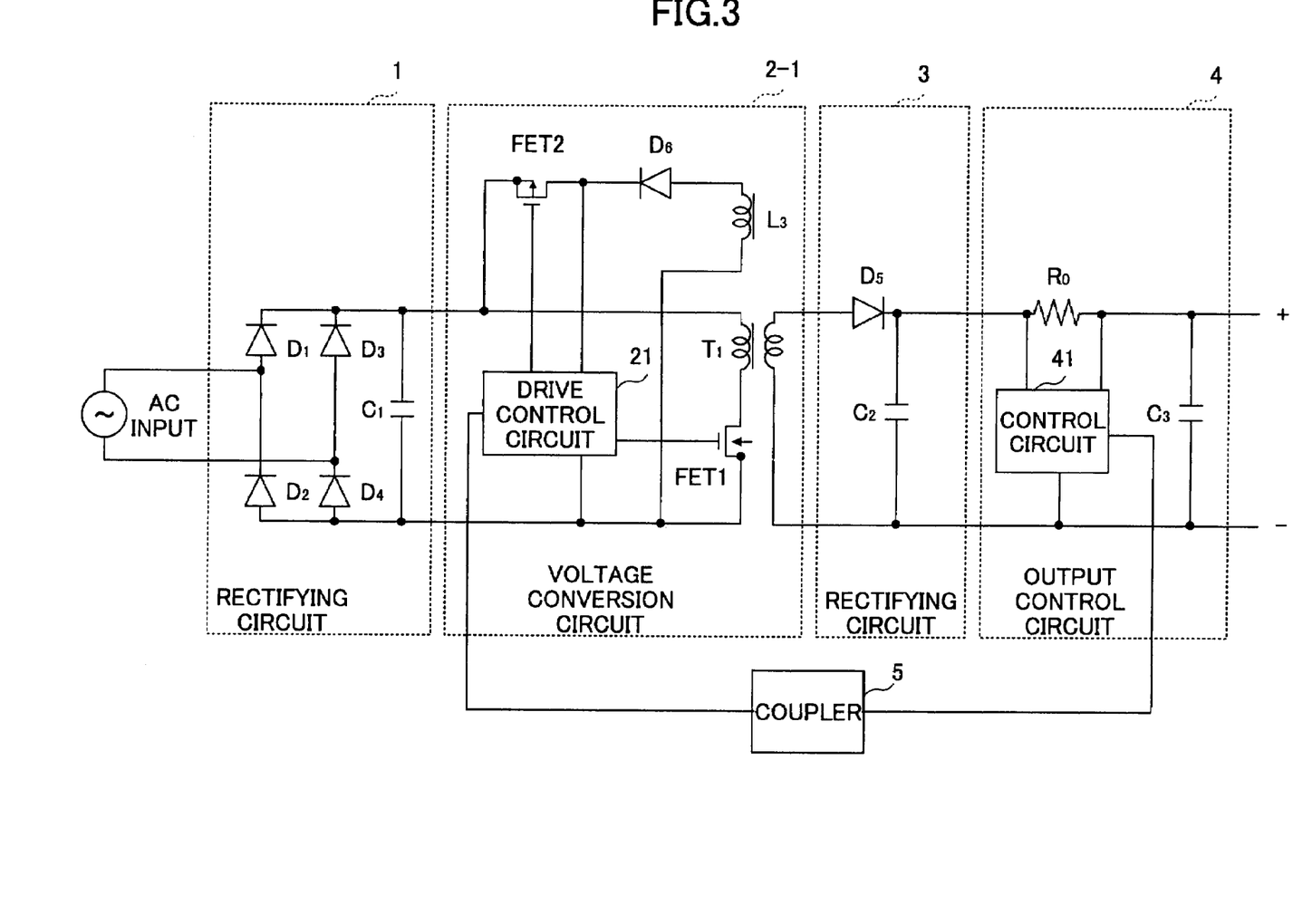
FIG. 3 is a circuit diagram for explaining a second conventional method.

FIG. 3 is a circuit diagram for explaining the second conventional method. In FIG. 3, those parts which are the same as those corresponding parts in FIG. 1 are designated by the same reference numerals, and a description thereof will be omitted.

As shown in FIG. 3, a switching circuit FET2, a diode D6, and a third winding L3 of the transformer T1 are provided in a voltage conversion circuit 2-1. The switching circuit FET2 is provided to turn ON/OFF the supply of the commercial AC power supply voltage with respect to the AC adapter. This switching circuit FET2 is turned ON/OFF by a primary side drive control circuit 21. The third winding L3 of the transformer T1 is provided to generate the third voltage by the transformer T1. The diode D6 is provided to rectify the third voltage generated by the third winding L3.

When the commercial AC power supply voltage is supplied to the AC adapter, the commercial AC power supply voltage is applied to the AC adapter via the switching circuit FET2, and the AC adapter starts to operate. When the AC adapter operates and the rated voltage is output on the secondary side of the transformer T1, a voltage is also output at the third winding L3 of the transformer T1. The primary side drive control circuit 21 turns OFF the switching circuit FET2 after the operation of the AC adapter starts, so as to switch the voltage supplied to the primary side drive control circuit to the third voltage which is generated by the third winding L3 which is added to the transformer T1. This third voltage is sufficiently lower than the commercial AC power supply voltage. Hence, the power consumption of the AC adapter is reduce by decreasing the voltage which is supplied to the primary side drive control circuit 21.

According to a third conventional method, two systems of AC-DC current-voltage conversion circuits are provided, and the AC-DC current-voltage conversion circuits which are to operate are switched depending on whether the electronic apparatus is in the operating stage or the standby state. This third conventional method is proposed in a Japanese Laid-Open Patent Application No. 2001-145355, for example.

According to the first through third conventional methods, a part within the current-voltage conversion circuit is always operating, even when the electronic apparatus which is connected to the current-voltage conversion circuit, such as the AC adapter, is in the standby state or the stopped state. For this reason, there was a problem in that it is impossible to reduce the power consumption of the current-voltage conversion circuit to zero, that is, to reduce the standby power to zero.

SUMMARY OF THE INVENTION

Accordingly, it is a general object of the present invention to provide a novel and useful power supply control method, current-voltage conversion circuit and electronic apparatus, in which the problems described above are eliminated.

Another and more specific object of the present invention is to provide a power supply control method, a current-voltage conversion circuit and an electronic apparatus, which can reduce the power consumption of the current-voltage conversion circuit to zero, that is, reduce the standby power to zero, when the electronic apparatus is in the standby state or the stopped state.

Still another object of the present invention is to provide a power supply control method adapted to a current-to-voltage conversion circuit which has a transformer for converting and outputting an input power, comprising stopping a power supply to the transformer when an output side of the current-to-voltage conversion circuit is in a no-load state; and starting a power supply to the transformer when an external voltage is applied to the output side of the current-to-voltage conversion circuit. According to the power supply control method of the present invention, it is possible to reduce the power consumption of the current-voltage conversion circuit to zero, that is, reduce the standby power to zero, when the electronic apparatus is in the standby state or the stopped state.

A further object of the present invention is to provide a current-to-voltage conversion circuit having an active state and a deactivated state, comprising an input section to input an input power; a transformer to convert the input power into an output power; an output section to output the output power; a first circuit to stop a power supply to the transformer and put the current-to-voltage conversion circuit into a deactivated state when the output section is in a no-load state; and a second circuit to start a power supply to the transformer and put the current-to-voltage conversion circuit into an active state when an external voltage is applied to the output section. According to the current-to-voltage conversion circuit of the present invention, it is possible to reduce the power consumption of the current-voltage conversion circuit to zero, that is, reduce the standby power to zero, when the electronic apparatus is in the standby state or the stopped state.

Another object of the present invention is to provide an electronic apparatus connectable to a current-to-voltage conversion circuit having an output side, where the current-to-voltage conversion circuit assumes a deactivated state when the output side is in a no-load state and assumes an active state when an external voltage is applied to the output side, and the electronic apparatus comprises a switching circuit to apply the external voltage to the output side of the current-to-voltage conversion circuit in the deactivated state. According to the electronic apparatus of the present invention, it is possible to reduce the power consumption of the current-voltage conversion circuit to zero, that is, reduce the standby power to zero, when the electronic apparatus is in the standby state or the stopped state.

Still another object of the present invention is to provide an electronic apparatus comprising a current-to-voltage conversion circuit comprising an input section to receive an input power, a transformer to convert the input power into an output power, an output section to output the output power, a first circuit to stop a power supply to the transformer and put the current-to-voltage conversion circuit into a deactivated state when the output section is in a no-load state, and a second circuit to start a power supply to the transformer and put the current-to-voltage conversion circuit into an active state when an external voltage is applied to the output section; and a control section to apply the external voltage to the output section of the current-to-voltage conversion circuit in the deactivated state. According to the electronic apparatus of the present invention, it is possible to reduce the power consumption of the current-voltage conversion circuit to zero, that is, reduce the standby power to zero, when the electronic apparatus is in the standby state or the stopped state.

A further object of the present invention is to provide a power supply control method adapted to a current-to-voltage conversion circuit which has a transformer for converting and outputting an input power, comprising detecting a no-load state of an output side of the current-to-voltage conversion circuit; and stopping a power supply to the transformer when the output side of the current-to-voltage conversion circuit is in the no-load state. According to the power supply control method of the present invention, it is possible to reduce the power consumption of the current-voltage conversion circuit to zero, that is, reduce the standby power to zero, when the electronic apparatus is in the standby state or the stopped state.

Another object of the present invention is to provide a current-to-voltage conversion circuit having an active state and a deactivated state, comprising an input section to input an input power; a transformer to convert the input power into an output power; an output section to output the output power; a detecting section to detect a no-load state of the output section; and a circuit to stop a power supply to the transformer and put the current-to-voltage conversion circuit into a deactivated state when the output section is in the no-load state. According to the current-to-voltage conversion circuit of the present invention, it is possible to reduce the power consumption of the current-voltage conversion circuit to zero, that is, reduce the standby power to zero, when the electronic apparatus is in the standby state or the stopped state.

Other objects and further features of the present invention will be apparent from the following detailed description when read in conjunction with the accompanying drawings.

DESCRIPTION OF THE PREFERRED EMBODIMENTS

A description will be given of various embodiments of a power supply control method, a current-voltage conversion circuit and an electronic apparatus according to the present invention, by referring to FIGS. 4 through 8.

In the present invention, a commercial AC power supply voltage is used when the electronic apparatus is in the operating stage. On the other hand, when the electronic apparatus is in the standby state or the stopped state, a battery exclusively for a standby operation is used, so that the standby power can be reduced to zero by completely stopping the operation of an AC-DC current-voltage conversion circuit such as an AC adapter. In addition, the AC-DC current-voltage conversion circuit, such as the AC adapter, which converts an AC input into a DC output, is operated and stopped, without providing a special interface circuit between the AC-DC current-voltage conversion circuit and the electronic apparatus.

Figure 4:
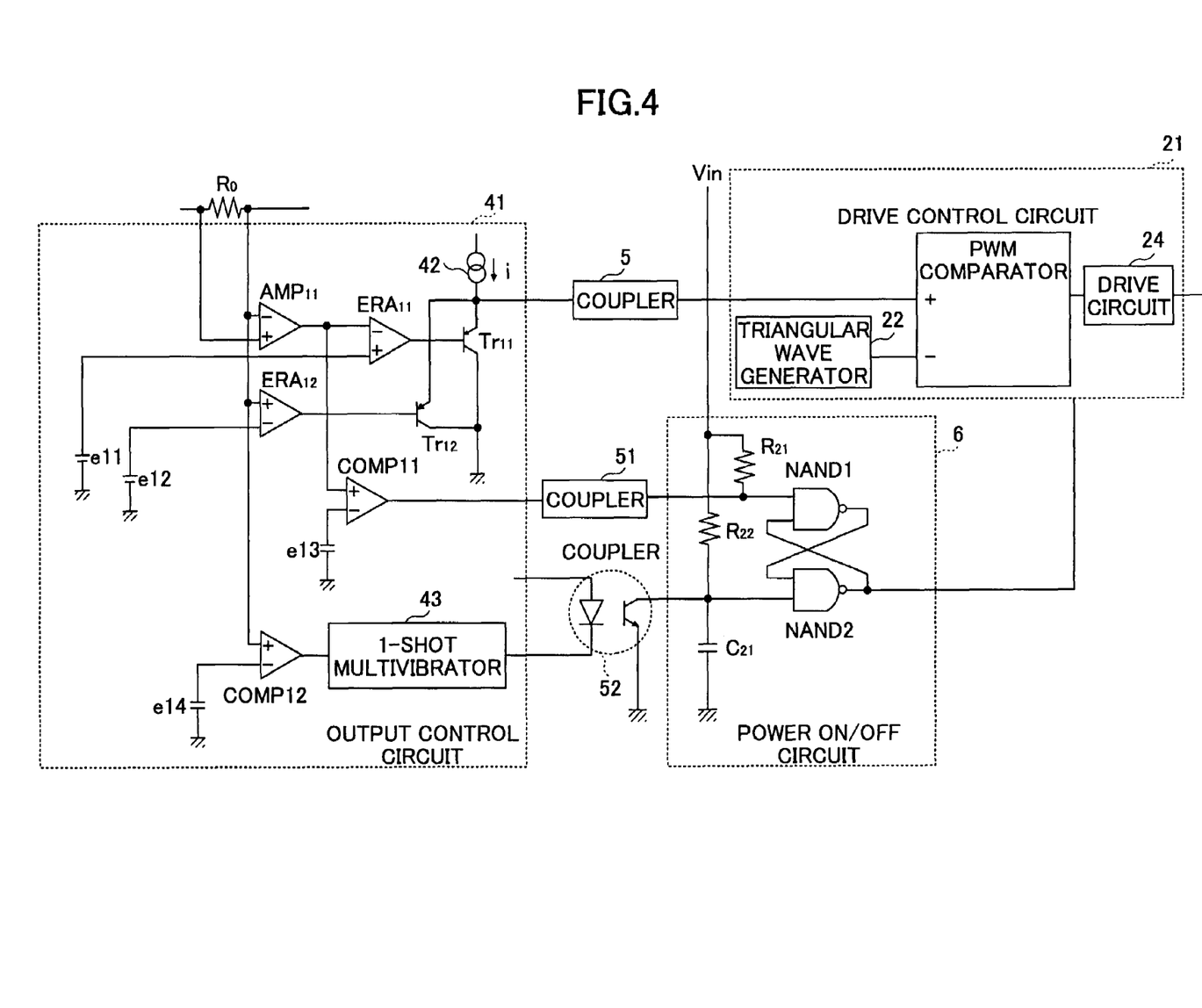
FIG. 4 is a circuit diagram showing an important part of a first embodiment of a current-voltage conversion circuit according to the present invention.

FIG. 4 is a circuit diagram showing an important part of a first embodiment of the current-voltage conversion circuit according to the present invention. This first embodiment of the current-voltage conversion circuit employs a first embodiment of the power supply control method according to the present invention. It is assumed for the sake of convenience that the current-voltage conversion circuit forms the AC adapter, and in FIG. 4, those parts which are the same as those corresponding parts in FIGS. 1 and 2 are designated by the same reference numerals, and a description thereof will be omitted.

In this embodiment, a control circuit 41 within an output control circuit 4 shown in FIG. 4 includes, in addition to the elements shown in FIG. 2, a voltage comparator COMP11 for comparing an output current of an AC adapter and a threshold current, a voltage comparator COMP12 for comparing an output voltage of the AC adapter and a threshold voltage, and a 1-shot multivibrator (flip-flop) circuit 43 for outputting an output of the voltage comparator COMP12 only for a predetermined time. In FIG. 4, e11 through e14 denote threshold voltages.

In addition, a power supply ON/OFF circuit 6 is provided between the control circuit 41 and a drive control circuit 21 of a voltage conversion circuit 2. The power supply ON/OFF circuit 6 controls ON/OFF of the power supply of a primary side circuit of a transformer T1 in response to a signal from a secondary side circuit of the transformer T1. The power ON/OFF circuit 6 has a function of turning ON the power supply to start the operation of the AC adapter when an AC power supply voltage is applied to the AC adapter or, in response to a power supply ON signal from the power supply of the secondary side circuit of the transformer T1, and a function of turning OFF the power supply to stop the operation of the AC adapter in response to a power OFF signal from the secondary side circuit of the transformer T1. The power ON/OFF circuit 6 includes NAND circuits NAND1 and NAND2 forming a flip-flop (FF), resistors R21 and R22, and a capacitor C21.

The control circuit 41 and the power ON/OFF circuit 6 are connected via coupler circuits 51 and 52. Each of the coupler circuits 51 and 52 is formed by a photo-coupler, similarly to the coupler circuit 5. The coupler circuit 51 transfers an output of the voltage comparator COMP11 to the primary side of the transformer T1, and the coupler circuit 52 transfers the output of the voltage comparator COMP12 to the primary side of the transformer T1 via the 1-shot multivibrator circuit 43.

The power ON/OFF circuit 6 instructs the start and stop of the operation of the AC adapter. When Vin being obtained from a commercial AC power supply voltage is generated and applied to the power ON/OFF circuit 6, the capacitor C21 is charged via the resistor R22, and a potential of the capacitor C21 changes from a ground potential to a potential Vin as the charging progresses. One input of the NAND circuit NAND2 connected to the capacitor C21 is initially at the ground potential, and the NAND circuit NAND2 accordingly outputs a high-level signal. One input of the NAND circuit NAND1 connected to the resistor R21 has a high level, the other input of the NAND circuit NAND1 is connected to an output of the NAND circuit NAND2, and the NAND circuit NAND1 accordingly outputs a low-level signal.

Even when one input of the NAND circuit NAND2 changes from the low level to the high level due to the charging of the capacitor C21, the low-level signal output from the NAND circuit NAND1 is input to the other input of the NAND circuit NAND2, so that the NAND circuit NAND2 continues to output the high-level signal. Since the high-level signal output from the NAND circuit NAND2 forms the power ON signal for a drive control circuit 21 on the primary side of the AC adapter, the AC adapter assumes an ON state (activated state) and starts to operate.

In order to put the AC adapter in an OFF state (deactivated state), the high-level signal input to one input of the NAND circuit NAND1 via the resistor R21 is switched to a low-level signal. When the high-level signal input to this one input of the NAND circuit NAND1 via the resistor R21 is switched to the low-level signal by grounding this one input of the NAND circuit NAND1 to the ground potential, the NAND circuit NAND1 outputs a high-level signal. In this state, one input of the NAND circuit NAND2 is at a high-level via the resistor R22, and the other input of the NAND circuit NAND2 is connected to the output of the NAND circuit NAND1. Hence, the NAND circuit NAND2 outputs a low-level signal.

Because the low-level signal output from the NAND circuit NAND2 is input to the other input of the NAND circuit NAND1, the NAND circuit NAND1 continues to output the high-level signal. As a result, the NAND circuit NAND2 also continues to output the low-level signal. Since the low-level signal output from the NAND circuit NAND1 forms the power OFF signal for the drive control circuit 21 on the primary side of the AC adapter, the AC adapter assumes an OFF state (deactivated state) and stops to operate.

When putting the AC adapter in the ON state again, the high-level signal input to one input of the NAND circuit NAND2 via the resistor R22 is switched to a low-level signal. When the high-level signal input to this one input of the NAND circuit NAND2 via the resistor R22 is switched to the low-level signal by grounding this one input of the NAND circuit NAND2 to the ground potential, the NAND circuit NAND2 outputs a high-level signal. In this state, one input of the NAND circuit NAND1 is at a high-level via the resistor R21, and the other input of the NAND circuit NAND1 is connected to the output of the NAND circuit NAND2. Hence, the NAND circuit NAND1 outputs a low-level signal.

Because the low-level signal output from the NAND circuit NAND1 is input to the other input of the NAND circuit NAND2, the NAND circuit NAND2 continues to output the high-level signal. Since the high-level signal output from the NAND circuit NAND2 forms the power ON signal for the drive control circuit 21 on the primary side of the AC adapter, the AC adapter assumes the ON state (activated state) and starts to operate.

In FIG. 4, the voltage comparator COMP11 is provided to detect whether or not an output of the AC adapter is in a no-load state. When the output current of the AC adapter becomes zero and the no-load state continues, the voltage comparator COMP11 outputs a low-level signal, and grounds, via the coupler circuit 51, one input of the NAND circuit NAND1 connected to the resistor R21 of the power supply ON/OFF circuit 6 on the primary side. As a result, the power supply ON/OFF circuit 6 stops the operation of the AC adapter. When the AC adapter is in the stopped state, all of the circuits within the AC adapter are in the stopped state, and no power consumption occurs. The NAND circuits NAND1 and NAND2 of the power supply ON/OFF circuit 6 merely hold states by voltages, and do not consume power.

The voltage comparator COMP12 is provided to detect that an external voltage has been applied to the secondary side circuit of the AC adapter. When the AC adapter is in the stopped state, the AC adapter does not output a voltage, and the secondary side circuit is in a power supply OFF state.

When the external voltage is applied to the output side of the AC adapter, the secondary side circuit starts to operate using this external voltage as a power supply voltage. Hence, the voltage comparator COMP12 detects that the output voltage of the AC adapter is not zero, and turns ON the 1-shot multivibrator circuit 43. When the input signal to the 1-shot multivibrator circuit 43 is ON (high level), the 1-shot multivibrator circuit 43 outputs an output signal which is ON (high level) only for the predetermined time, that is, turns OFF (low level) after this predetermined time, even if the input signal maintains the ON (high-level) state. Accordingly, the 1-shot multivibrator circuit 43 turns ON the coupler circuit 52 only for the predetermined time, and short-circuits the capacitor C21 of the power ON/OFF circuit 6 for the predetermined time, so that the signal input to one input of the NAND circuit NAND2 via the coupler circuit 52 has the low level. As a result, the power ON/OFF circuit 6 starts the operation of the AC adapter.

Therefore, it is possible to turn the AC adapter ON and OFF without the need to provide a special interface between the AC adapter and the electronic apparatus.

As described above, this embodiment detects the no-load state by the secondary side circuit of the AC adapter when the output of the AC adapter assumes the no-load state, and supplies the power OFF signal to the power ON/OFF circuit 6 on the primary side so as to stop the operation of the AC adapter. When an external voltage is applied to the output side of the AC adapter in a state where the AC adapter is in the stopped state and the output voltage of the AC adapter is zero, the secondary side circuit of the AC adapter starts to operate by the applied external voltage, and this embodiment supplies the power ON signal to the power ON/OFF circuit 6 on the primary side so as to start the operation of the AC adapter.

Figure 5:
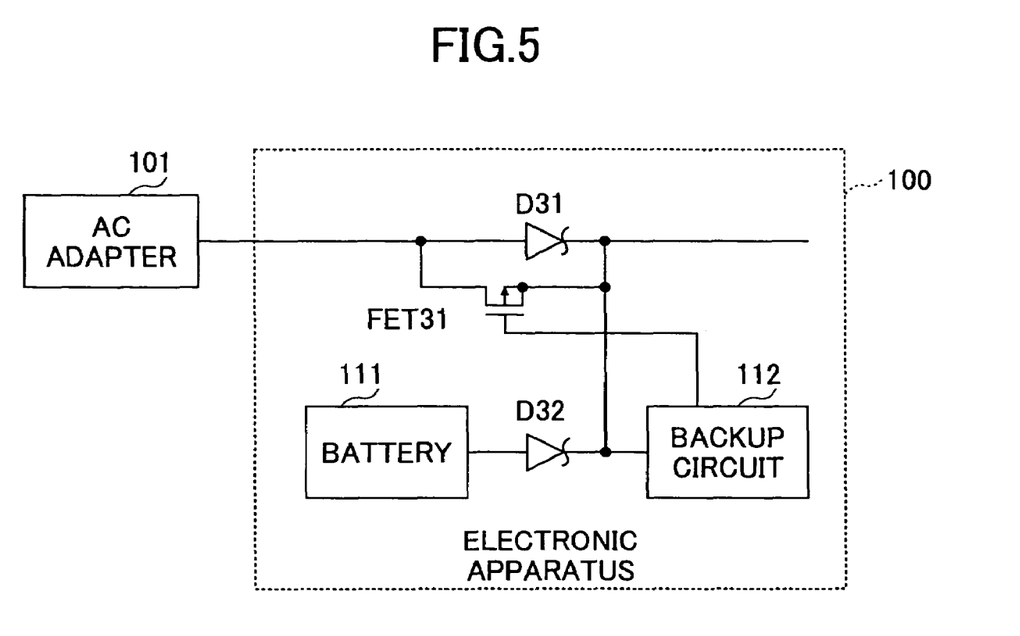
FIG. 5 is a system block diagram showing a first embodiment of an electronic apparatus according to the present invention.

FIG. 5 is a system block diagram showing a first embodiment of the electronic apparatus according to the present invention. This first embodiment of the electronic apparatus may be applied to various electronic apparatuses using a secondary battery, such as lap-top personal computers and portable telephone sets.

As shown in FIG. 5, an electronic apparatus 100 is connectable to an AC adapter 101 having the structure described above. A current-voltage conversion circuit of the electronic apparatus 100 includes a secondary battery 111, a backup circuit 112, diodes D31 and D32, and a switching circuit FET31. The diode D31 supplies a power supply voltage from the AC adapter 101 to various parts within the electronic apparatus 100. In addition, the diode D31 forms a reverse flow preventing circuit for preventing a power supply voltage from the secondary battery 111 from flowing in a reverse direction towards the AC adapter 101. The diode D32 forms a protection circuit for preventing the power supply voltage from the AC adapter 101 from being applied to the secondary battery 111 within the electronic apparatus 100.

The power supply voltage from the AC adapter 101 is supplied to the electronic apparatus 100 via the diode D31 or, the power supply voltage from the secondary battery 111 is supplied to the electronic apparatus 100 via the diode D32. The electronic apparatus 100 operates based on the power supply voltage from the AC adapter 101 when the AC adapter 101 is operating, and operates based on the power supply voltage from the secondary battery 111 when the AC adapter has stopped operating.

The switching circuit FET31 is controlled by the backup circuit 112, and turns ON the AC adapter 101 when the AC adapter 101 is in the OFF state. When the switching circuit FET31 is turned ON in a state where the AC adapter 101 is in the OFF state, the power supply voltage from the secondary battery 111 is applied to the output side of the AC adapter 101, to put the AC adapter 101 in the ON state.

Therefore, the power supply voltage from the AC adapter 101 is used when the electronic apparatus 100 is operating. On the other hand, when the electronic apparatus 100 is in the standby state or the stopped state, the power supply voltage from the secondary battery 111, exclusively for the standby operation, is used. For this reason, when the electronic apparatus 100 is in the standby state or the stopped state, the standby power can be made zero by completely stopping the operation of the AC adapter 101. In addition, it is possible to start and stop the operation of the AC adapter 101, without the need to provide a special interface circuit between the electronic apparatus 100 and the AC adapter 101.

Figure 6:
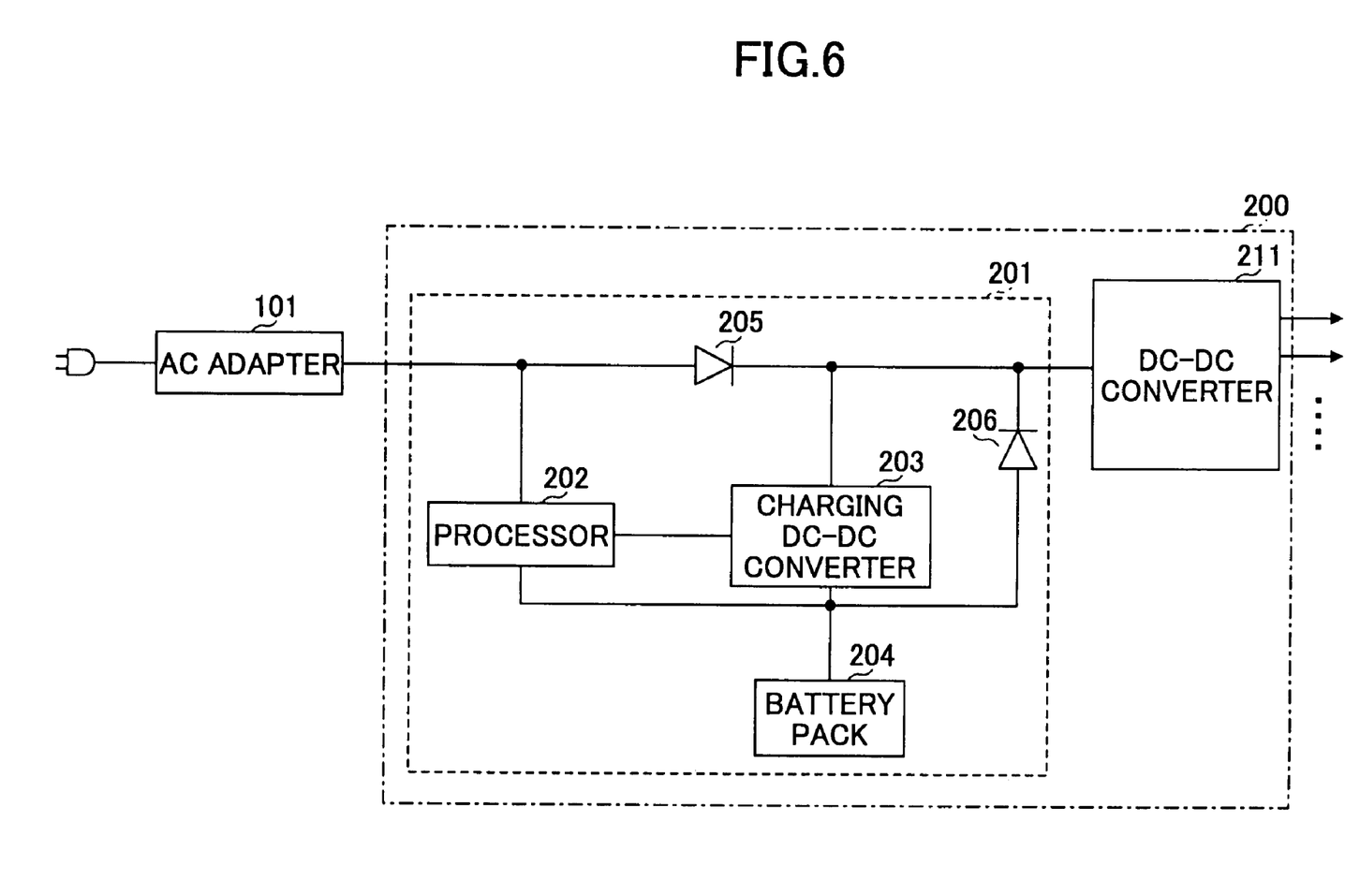
FIG. 6 is a system block diagram showing an important part of a second embodiment of the electronic apparatus according to the present invention.

Next, a description will be given of a second embodiment of the electronic apparatus according to the present invention, by referring to FIGS. 6 and 7. This second embodiment of the electronic apparatus employs a second embodiment of the power supply control method according to the present invention. FIG. 6 is a system block diagram showing an important part of this second embodiment of the electronic apparatus.

An electronic apparatus 200 shown in FIG. 6 is connectable to the AC adapter 101 having the structure described above. The electronic apparatus 200 includes a control circuit section 201 and a DC-DC converter 211. The control circuit section 201 is formed by a semiconductor integrated circuit (chip), for example. The control circuit section 201 includes a processor 202 which is formed by a CPU or the like, a charging DC-DC converter 203, a battery pack 204, and diodes 205 and 206. The DC-DC converter 211 supplies an internal power supply voltage to various parts within the electronic apparatus 200.

Figure 7:
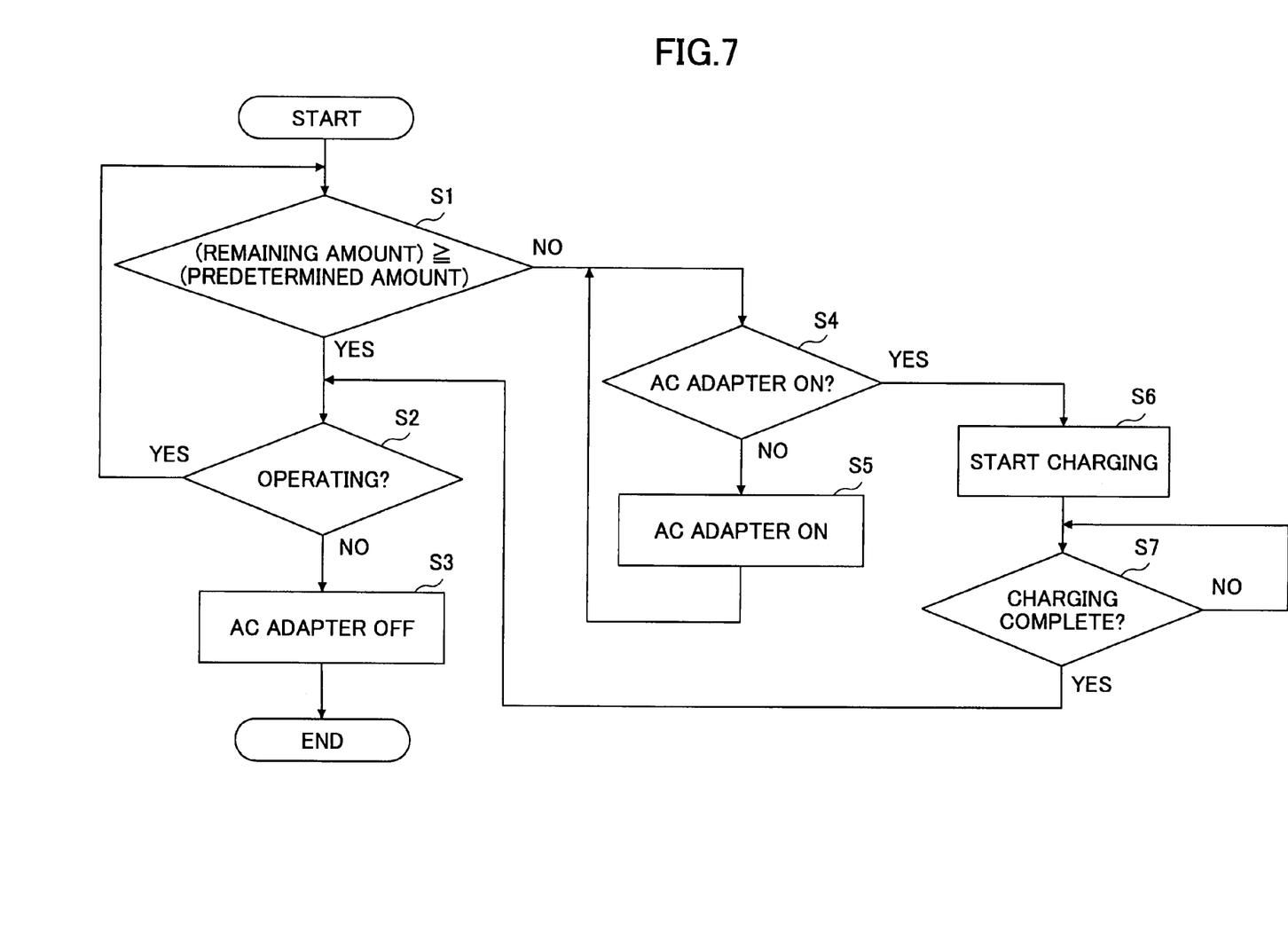
FIG. 7 is a flow chart for explaining an operation of a processor of the electronic apparatus.

FIG. 7 is a flow chart for explaining an operation of the processor 202. In FIG. 7, a step S1 decides whether or not a remaining capacity of the battery pack 204 is greater than or equal to a predetermined amount. The decision of the step S1 may be made by obtaining the remaining capacity by a known method within the processor 202. Alternatively, if the battery pack 204 is constructed to output a remaining capacity signal which indicates the remaining capacity of the battery pack 204, the decision of the step S1 may be made by a known method based on the remaining capacity signal output from the battery pack 204.

If the decision result in the step S1 is YES, a step S2 decides whether or not the electronic apparatus 200 is operating, that is, in the operating state. The process returns to the step S1 if the decision result in the step S2 is YES. If the electronic apparatus 200 is in the standby state or the stopped state and the decision result in the step S2 is NO, a step S3 realizes within the processor 202 a state corresponding to the state where the switching circuit FET31 shown in FIG. 5 is in the OFF state, and the process ends. In this case, the AC adapter 101 assumes the OFF state, and the electronic apparatus 200 will not receive the power supply voltage from the AC adapter 101.

On the other hand, if the decision result in the step S1 is NO, a step S4 decides whether or not the AC adapter 101 is in the ON state. If the decision result in the step S4 is NO, a step S5 operates the electronic apparatus 200 by the power supply voltage from the battery pack 204, and realizes within the processor 202 a state corresponding to the state where the switching circuit FET31 shown in FIG. 5 is in the ON state, so as to put the AC adapter 101 in the ON state, and the process returns to the step S4.

If the decision result in the step S4 is YES, a step S6 charges the battery pack 204 via the charging DC-DC converter 203, and the process advances to a step S7. The step S7 decides, by a known method, whether or not the charging of the battery pack 204 is completed, and the process returns to the step S2 if the decision result in the step S7 becomes YES.

Figure 8:
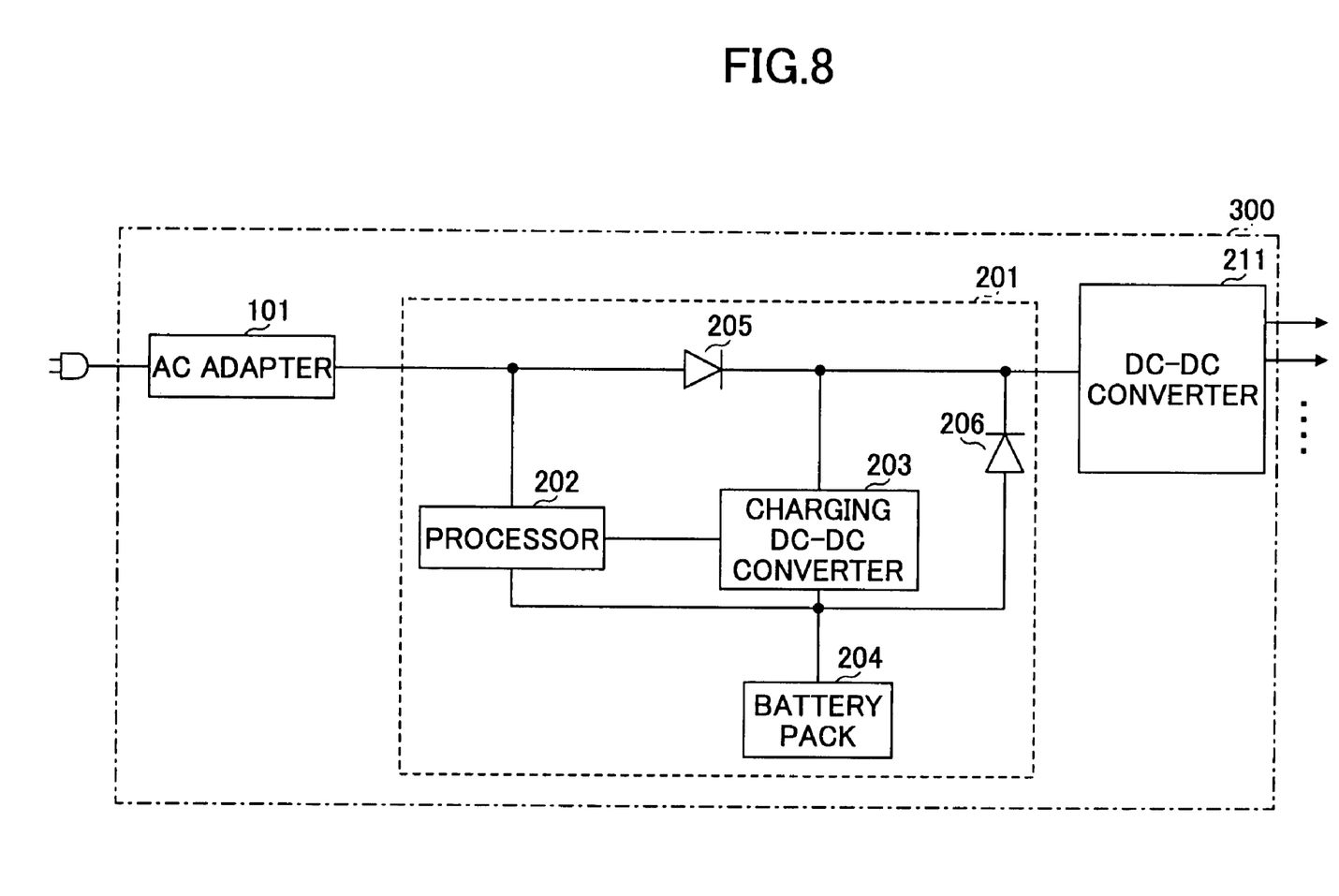
FIG. 8 is a system block diagram showing an important part of a third embodiment of the electronic apparatus according to the present invention.

Next, a description will be given of a third embodiment of the electronic apparatus according to the present invention, by referring to FIG. 8. This third embodiment of the electronic apparatus employs a third embodiment of the power supply control method according to the present invention. FIG. 8 is a system block diagram showing an important part of this third embodiment of the electronic apparatus. In FIG. 8, those parts which are the same as those corresponding parts in FIG. 6 are designated by the same reference numerals, and a description thereof will be omitted.

An electronic apparatus 300 shown in FIG. 8 has a built-in AC adapter 101. Accordingly, there is no need to connect to the electronic apparatus 300 an AC adapter which is separate from the electronic apparatus 300.

In each of the embodiments described heretofore, the present invention is applied to the AC adapter. However, the application of the present invention is not limited to the AC adapter, and the present invention is similarly applicable to other current-voltage converters, such as DC-DC converters, and built-in type conversion circuits which are built into an apparatus.

Further, the present invention is not limited to these embodiments, but various variations and modifications may be made without departing from the scope of the present invention.

What is claimed is:

1. A current-to-voltage conversion circuit having an active state and a deactivated state, comprising:
    an input section to input an input power;
    a transformer to convert the input power into an output power;
    an output section to output the output power;
    a first circuit to stop a power supply to the transformer and put the current-to-voltage conversion circuit into a deactivated state when the output section is in a no-load state or a standby state, wherein said first circuit includes a first comparator to compare an output current on a secondary side of the transformer and a threshold current;
    a second circuit to start a power supply to the transformer and put the current-to-voltage conversion circuit into an active state when a voltage from external of the current-to-voltage conversion circuit is applied to the output section;
    a drive control circuit to drive the transformer; and
    a first coupler circuit including a photo-coupler to couple an output of the first comparator and an input of the drive control circuit.

2. The current-to-voltage conversion circuit as claimed in claim 1, wherein said second circuit includes a second comparator to compare an output voltage on a secondary side of the transformer and a threshold voltage.

3. The current-to-voltage conversion circuit as claimed in claim 2, further comprising:
    a second coupler circuit including a photo-coupler to couple an output of the second comparator and the input of the drive control circuit.

4. A current-to-voltage conversion circuit having an active state and a deactivated state, comprising:
    an input section to input an input power;
    a transformer to convert the input power into an output power;
    an output section to output the output power;
    a first circuit to stop a power supply to the transformer and put the current-to-voltage conversion circuit into a deactivated state when the output section is in a no-load state or a standby state; and
    a second circuit to start a power supply to the transformer and put the current-to-voltage conversion circuit into an active state when a voltage from external of the current-to-voltage conversion circuit is applied to the output section,
    wherein said second circuit includes a comparator to compare an output voltage on a secondary side of the transformer and a threshold voltage.

5. The current-to-voltage conversion circuit as claimed in claim 4, further comprising:
    a drive control circuit to drive the transformer; and
    a second coupler circuit including a photo-coupler to couple an output of the second comparator and an input of the drive control circuit.

6. A current-to-voltage conversion circuit having an active state and a deactivated state, comprising:
    an input section to input an input power;
    a transformer to convert the input power into an output power;
    an output section to output the output power;
    a first circuit to stop a power supply to the transformer and put the current-to-voltage conversion circuit into a deactivated state when the output section is in a no-load state or a standby state, wherein said first circuit includes a first comparator to compare an output current on a secondary side of the transformer and a threshold current; and
    a second circuit to start a power supply to the transformer and put the current-to-voltage conversion circuit into an active state when a voltage from external of the current-to-voltage conversion circuit is applied to the output section,
    wherein said second circuit includes a second comparator to compare an output voltage on a secondary side of the transformer and a threshold voltage.

7. The current-to-voltage conversion circuit as claimed in claim 6, further comprising:
    a drive control circuit to drive the transformer; and
    a second coupler circuit including a photo-coupler to couple an output of the second comparator and an input of the drive control circuit.

* * * * *